May 20, 1952 — G. L. HAMMON — 2,597,478
REGULATOR VALVE
Filed March 11, 1947

INVENTOR.
GEORGE L. HAMMON
BY
ATTORNEY

Patented May 20, 1952

2,597,478

UNITED STATES PATENT OFFICE 2,597,478

REGULATOR VALVE

George L. Hammon, Berkeley, Calif., assignor to National Welding Equipment Co., San Francisco, Calif., a corporation of California Application March 11, 1947, Serial No. 733,924

2 Claims. (Cl. 50—23)

This invention relates to an improved regulator and has particular reference to an improvement in the valve mechanism which connects the high-pressure chamber to the expansion chamber.

A regulator is used to lower the gas pressure to a working pressure from a higher pressure source, such as a cylinder of compressed oxygen. Special problems arise where a regulator takes gas at extremely high pressure to reduce it to lower pressures.

One object of this invention is to provide a simplified and improved nozzle and valve arrangement to connect the high-pressure chamber of the regulator to the expansion chamber.

Another object of the invention is to provide a valve which also acts as a nozzle and thus eliminates the necessity for a separate nozzle mechanism.

Another object of the invention is to provide a regulator valve which does not "clatter," i. e., vibrate noisily during operation.

Other objects of the invention are to provide for a valve-nozzle assembly which will have fewer pieces, will be cheaper to make, simpler to repair, easier to align, and which can be machined from solid rod stock.

Other objects and advantages of the invention and the problems it solves will appear in the course of the following description.

Figure 1:
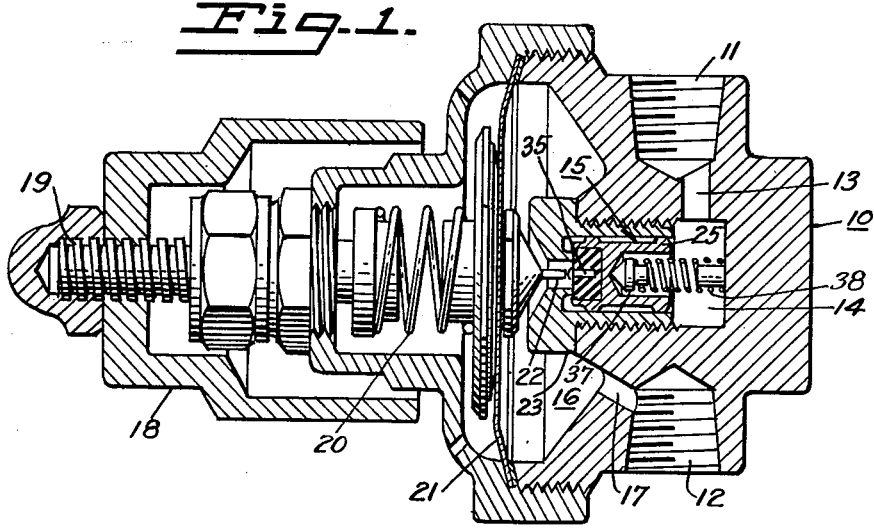
Fig. 1 is a side view, mostly in section, of a regulator embodying this invention.

The regulator housing 10 has an inlet 11, which is adapted to be attached to a source of high-pressure gas, such as a cylinder of compressed oxygen, and it has an outlet 12 from which the gas issues at the desired working pressure.

The path of the gas through the regulator is by way of the inlet duct 13 into the high-pressure chamber 14, through the valve 15, into the expansion chamber 16, and by way of the outlet duct 17 to the outlet 12.

The problem in this type of device has been to devise a simple inexpensive valve which will work almost indefinitely without need of repair or replacement, which will be rugged in spite of its apparent small size, and which will not chatter or vibrate during use and thereby wear out prematurely.

The regulator is manually adjusted by turning the handle 18 so that the adjusting screw 19 increases or decreases the tension on the spring 20. The spring 20 acts counter to the pressure exerted by the diaphragm 21, and when the diaphragm pressure is not great enough to overcome the spring pressure, the spring 20 actuates the pin 22 which opens the valve.

Figure 2:
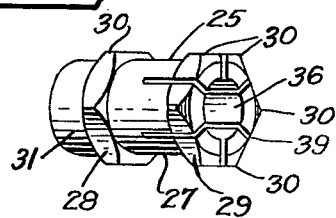
Fig. 2 is a side view taken at an angle looking into the open end of the movable valve members.
Figure 3:
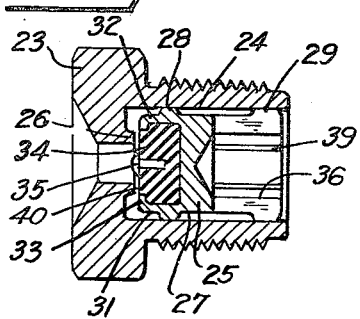
Fig. 3 is a side view in section of the improved valve.
Figure 4:
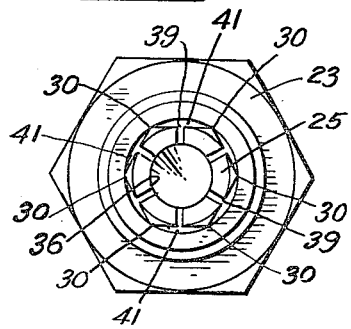
Fig. 4 is an end view of the valve member shown in Fig. 3.

The valve is contained in a sleeve 23 (see Fig. 3). This recessed cylindrical member, preferably of brass, is threaded on the outside to fit in the housing 10 between the high-pressure chamber 14 and the low pressure expansion chamber 16. A hole 24 allows communication between these two chambers. Within the sleeve 23 fits the valve piston and seat-carrier assembly 25, shown in Fig. 2, which engages the valve seat ridge 26.

The valve piston 25 consists of a cylindrical tube 27 having collars 28 and 29, with spaced bearing edges 30 to hold the piston 25 in slidable position in the valve sleeve 23. There may be any number of these bearing edges 30 although I have found six to be adequate. The space 41 between the bearing points 30 is open to allow free passage of gas through the opening 24.

One end of the piston 25 has a packing-holding portion 31, formed by a recess leaving a thin wall 32 which is crimped at 33 to hold the packing material 34. A pin 35, preferably of hardened material, is embedded in the packing 34 in position to be engaged by the actuating pin 22. The packing 34 is preferably non-metallic and can be made so because the thin wall 32 surrounds and supports it against injury and particularly from the gases getting in behind the washer and forcing it away from the end of the piston 25.

The other end of the piston 25 is recessed with a cylindrical bore 36 and preferably has a conical shaped end to receive the spring button 37 which is carried on the end of the spring 38. This spring 38 holds the packing 34 on the valve seat 26 except when the spring 20 is able to overcome the pressure of the diaphragm 21.

The end of the valve piston 25 opposite its seat end is provided with slits 39, preferably beginning at the midpoints between the bearing members 30. These slits 39 permit the portions between the slits to act as individual springs holding the bearing edges 30 in firm yielding sliding contact with the cylinder bore 23. These edges 30 preferably are burnished to their final size so that there is an almost exact fitting into the sleeve 23, with feather-like sliding contact against the sleeve bore. It is apparently this combination of small burnished-face contact points with the light spring-like thrust provided by the material between the slits 39 that prevents this valve 15 from chattering. The metal-against-metal contact of the piston 25 against the walls of the sleeve 23, when augmented by the spring 38, enables the piston 25 to maintain itself without vibration in the position where it is urged by the actuating pin 22, in spite of the high-pressure stream of gas passing through the gaps 41 between the faces 30.

An advantage of this invention is the fact that the valve parts formed as above noted act also as a nozzle, and do away with a separate nozzle mechanism.

The nozzle is provided by the passage 40 between the valve seat 26 and the packing 34. In its normally closed position the packing 34 is pressed against the seat 26 by the spring 38, and the contact secures a complete closure. When the screw 19 is turned and the spring 20 is compressed enough to overcome the pressure on the diaphragm 21, the actuating pin 22 presses against the pin 35 and forces the valve to open. Then the passage 40 between the valve seat 26 and the packing 34 becomes the nozzle opening of the valve 15, and since the piston 25 is held fixed in that position, as has already been described, there is a steady flow of gas from the high-pressure chamber 14 through the nozzle passage 40 and the opening 24 into the low-pressure or expansion chamber 16.

It can be seen from the foregoing description and from the drawings that the parts of the valve 15 can be machined from solid rod stock readily, simply, and with great accuracy. The entire operations involved are less costly and more productive of accuracy than are finished castings. It is preferable to use polygonal stock so that by burnishing or otherwise relieving the corners the bearing edges 30 are obtained and the flat portions between the bearing faces leave space between the sleeve wall and the bearing faces which serve as passages 41 to let the gas pass from the chamber 14 to the low-pressure chamber 16.

It is to be understood that I have described a preferred example of my invention, and that various changes may be made in the shape, size, material and arrangement of the parts without departing from the spirit of my invention or the scope of the claims. It will also be understood that the invention is as applicable on a two-stage regulator as on the single-stage regulator in connection with which it has been described.

I claim:

1. In a valve regulator of the type having a body portion and a diaphragm supported by said body portion, a spring opposing said diaphragm, a chamber formed by said body portion and said diaphragm opposite said spring, and a valve actuator movable with said diaphragm, the combination of a cylindrical member mounted in said body portion and projecting into said chamber and having an opening communicating with said chamber and surrounded by a valve seat through which opening said actuator extends to open the valve to pass gas into said chamber, a piston member slidable in said cylindrical member spring means yieldably holding said piston member against said seat, said piston member having a recess in each end thereof, the recess on its end adjacent said seat having a packing held therein by crimping over the end of the wall forming the recess, the wall forming the recess on the other end of the piston having a plurality of narrow, open-end slits extending in from said other end to give radial resiliency to said wall portions, and a plurality of short bearing edges circumferentially spaced around each end of said piston with clearance between said bearing edges for the passage of gas into said chamber, said bearing edges on the slit end of said piston being located on at least a plurality of said slit wall portions.

2. A valve designed to be employed in a diaphragm type regulator for reducing the pressure of gas from a high pressure as received in its inlet to a lower gas pressure issuing from its outlet, including a cylindrical member having a head end provided with a cylindrical bore, a seat extending around the bore, a piston including a cylindrical tube having a polygonal collar adjacent each extremity thereof, the angles of said collars providing short edge contact with the wall of said cylindrical member, said piston having a plurality of axial relatively narrow slits through its wall and through the polygonal sides of the collar adjacent the extremity facing the fully-open end of said cylindrical member, said slits being narrow in proportion to the wall and extending in from said fully-open end, a packing crimped into said piston facing said seat, spring means urging said packing against said seat.

GEORGE L. HAMMON.

REFERENCES CITED

The following references are of record in the file of this patent:

UNITED STATES PATENTS

| Number | Name | Date |
|---|---|---|
| 645,722 | Holmes | Mar. 20, 1900 |
| 1,063,065 | Regondi | May 27, 1913 |
| 1,231,293 | Peters | June 26, 1917 |
| 1,264,006 | Bucknam | Apr. 23, 1918 |
| 2,005,445 | Wiedhofft | June 18, 1935 |
| 2,115,580 | Hughes | Apr. 26, 1938 |
| 2,195,728 | Jones | Apr. 2, 1940 |
| 2,478,040 | Campbell | Aug. 2, 1949 |